(12) United States Patent
Moore

(10) Patent No.: US 7,957,953 B2
(45) Date of Patent: Jun. 7, 2011

(54) WEIGHTED LINEAR BILINGUAL WORD ALIGNMENT MODEL

(75) Inventor: Robert C. Moore, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 714 days.

(21) Appl. No.: 11/242,290

(22) Filed: Oct. 3, 2005

(65) Prior Publication Data

US 2007/0078654 A1 Apr. 5, 2007

(51) Int. Cl.
*G06F 17/28* (2006.01)
*G06F 17/20* (2006.01)

(52) U.S. Cl. .............. 704/2; 704/1; 704/3; 704/4; 704/5

(58) Field of Classification Search .................. 704/1–10
See application file for complete search history.

(56) References Cited

U.S. PATENT DOCUMENTS

| | | | |
|---|---|---|---|
| 5,907,821 A | 5/1999 | Kaji et al. | |
| 6,236,958 B1 * | 5/2001 | Lange et al. | 704/8 |
| 7,680,647 B2 | 3/2010 | Moore | |
| 2002/0107683 A1 | 8/2002 | Eisele | 704/2 |
| 2002/0198701 A1 | 12/2002 | Moore | 704/2 |
| 2003/0061023 A1 | 3/2003 | Menezes et al. | 704/4 |
| 2003/0204400 A1 | 10/2003 | Marcu et al. | 704/251 |
| 2004/0044530 A1 | 3/2004 | Moore | 704/254 |
| 2004/0098247 A1 * | 5/2004 | Moore | 704/4 |
| 2005/0038643 A1 * | 2/2005 | Koehn | 704/2 |
| 2005/0216253 A1 | 9/2005 | Brockett | |
| 2006/0190241 A1 * | 8/2006 | Goutte et al. | 704/2 |
| 2006/0287847 A1 | 12/2006 | Moore | |
| 2008/0109209 A1 | 5/2008 | Fraser et al. | |

FOREIGN PATENT DOCUMENTS

| | | |
|---|---|---|
| KR | 1020000019194 A | 4/2000 |
| KR | 1020040018008 A | 3/2004 |
| KR | 1020010094627 A | 5/2010 |
| WO | 0033211 A2 | 6/2000 |

OTHER PUBLICATIONS

Collins, M. 2002. Discriminative training methods for hidden Markov models: theory and experiments with perceptron algorithms. In Proceedings of the Acl-02 Conference on Empirical Methods in Natural Language Processing—vol. 10 Annual Meeting of the ACL. Association for Computational Linguistics, Morristown, NJ, 1-8.*
Gildea, D. 2003. Loosely tree-based alignment for machine translation. In Proceedings of the 41st Annual Meeting on Association for Computational Linguistics—vol. 1 (Sapporo, Japan, Jul. 7-12, 2003). Annual Meeting of the ACL. Association for Computational Linguistics, Morristown, NJ, 80-87. DOI=http://dx.doi.org/10.3115/1075096.1075107.*

(Continued)

*Primary Examiner* — James S Wozniak
*Assistant Examiner* — Matthew H Baker
(74) *Attorney, Agent, or Firm* — Joseph R. Kelly; Westman, Champlin & Kelly, P.A.

(57) ABSTRACT

A weighted linear word alignment model linearly combines weighted features to score a word alignment for a bilingual, aligned pair of text fragments. The features are each weighted by a feature weight. One of the features is a word association metric, which may be generated from surface statistics.

9 Claims, 11 Drawing Sheets

OTHER PUBLICATIONS

Young-Sook Hwang, Taro Watanabe, Yutaka Sasaki. Empirical Study of Utilizing Morph-Syntactic Information in SMT. Lecture Notes in Computer Science. vol. 3651/2005. 474-485. Tuesday, Sep. 27, 2005.*

Sonja Nießen. Improving Statistical Machine Translation using Morpho-syntactic Information. Doctoral thesis for Rheinisch-Westfaelischen Technischen Hochschule. Computational lingustics. Jun. 2004, vol. 30, No. 2, pp. 181-204.*

Och, F. J. and Ney, H. 2002. Discriminative training and maximum entropy models for statistical machine translation. In Proceedings of the 40th Annual Meeting on Association for Computational Linguistics (Philadelphia, Pennsylvania, Jul. 7-12, 2002). Annual Meeting of the ACL. Association for Computational Linguistics, Morristown, NJ, 295-302. D.*

Och, F. J. and Ney, H. 2004. The Alignment Template Approach to Statistical Machine Translation. Comput. Linguist. 30, 4 (Dec. 2004), 417-449. DOI=http://dx.doi.org/10.1162/0891201042544884.*

Nießen, S. and Ney, H. 2004. Statistical Machine Translation with Scarce Resources Using Morpho-syntactic Information. Comput. Linguist. 30, 2 (Jun. 2004), 181-204. DOI=http://dx.doi.org/10.1162/089120104323093285.*

Peter F. Brown et al., 1993. The Mathematics of Statistical Machine Translation: Parameter Estimation. Computational Linguistics, 19(2):263-311.

Colin Cherry et al., 2003. A Probability Model to Improve Word Alignment. In Proceedings of the 41st Meeting of the Association for Computational Linguistics, pp. 88-95, Sapporo, Japan.

Michael Collins, 2002. Discriminative Training Methods for Hidden Markov Models: Theory and Experiments with Perception Algorithms. In Proceedings of the Conference on Empirical Methods in Natural Language Processing (EMNLP) pp. 1-8, Philadelphia, Pennsylvania.

Rada Mihalcea et al., 2003. An Evaluation Exercise-for Word Alignment. In Proceedings of the HLT-NAACL 2003 Workshop, Building and Using Parallel Texts: Data Driven Machine Translation and Beyond, pp. 1-6, Edmonton, Alberta Canada.

Robert C. Moore 2004. On Log-Likelihood-Ratios and the Significance of Rare Events. In Proceedings of the 2004 Conference on Empirical Methods in Natural Language Processing, pp. 333-340, Barcelona, Spain.

PCT Search Report, PCT/US2006/037562 mailed Feb. 15, 2007.

Ted Dunning. 1993. Accurate Methods for Statistics of Surprise and Coincidence. Computation Linguistics, 19(1):61-74.

William A. Gale et al., 1991. Identifying Word Correspondences in Parallel Texts. In Proceedings of the Speech and Natural Language Workshop, pp. 152-157, Pacific Grove, CA.

Philipp Koehn et al., 2003. Statistical Phrase-Based Transplantation. In Proceedings HTL-NAACL 2003), pp. 127-133, Edmonton, Alberta, Canada.

I. Dan Melamed. 1998. Models of Co-occurrences. University of Pennsylvania, IRCS Tech. Report #98-05.

I. Dan Melamed. 2000. Models of Transnational Equivalence. Computational Linguistics 26(2):221-249.

Rada Mihalcdea et al. 2003. An Evaluation Exercise of Word Alignment. In Proceedings (HLT-NAACL) 2003 Workshop Building and Using Parallel Texts: Data Driven Machine Translation and Beyond, pp. 1-6, Edmonton, Alberta Canada.

Robert C. Moore. 2004. On Log-Likelihood Ratios and the Significance of Rare Events. In Proceedings of the 2004 Conference on Empirical Methods in Natural Language Processing, pp. 333-340, Barcelona, Spain.

Franz Joseph Och et al., 2003. A Systematic Comparison of Various Statistical Alignment Models. Computational Linguistics, 29(1):19-51.

Ioannis Tsochnantaridis et al. 2005, Large Margin Methods for Structured and Interdependent Output Variables. Journal of Machine Learning Research (JMLR) pp. 1453-1484.

* cited by examiner

WEIGHTED LINEAR BILINGUAL WORD ALIGNMENT MODEL

BACKGROUND

Machine translation is a process by which a textual input in a first language is automatically translated, using a computerized machine translation system, into a textual output in a second language. Some such systems operate using word based translation. In those systems, each word in the input text, in the first language, is translated into some number of corresponding words in the output text, in the second language. Better performing systems, however, are referred to as phrase-based translation systems. One example of those systems is set out in Koehn et al., *Statistical Phrase-Based Translation*, Proceedings of the Human Language Technology Conference of the North American Chapter of the Association for Computational Linguistics (HLT-NAACL) 127-133, Edmonton, Alberta, Canada (2003).

In order to train either of these two types of systems (and many other machine translation systems), current training systems often access a parallel bilingual corpus; that is, a text in one language and its translation into another language. The training systems first align text fragments in the bilingual corpus such that a text fragment (e.g., a sentence) in the first language is aligned with a text fragment (e.g., a sentence) in the second language that is the translation of the text fragment in the first language. When the text fragments are aligned sentences, this is referred to as a bilingual sentence-aligned data corpus.

In order to train the machine translation system, the training system must also know the individual word alignments within the aligned sentences. In other words, even though sentences have been identified as translations of one another in the bilingual, sentence-aligned corpus, the machine translation training system must also know which words in each sentence of the first language translate to which words in the aligned sentence in the second language.

One current approach to word alignment makes use of five translation models and is discussed in Brown et al., *The Mathematics of Statistical Machine Translation: Parameter Estimation*, Computational Linguistics, 19(2): 263-311 (1993). This approach to word alignment is sometimes augmented by a Hidden Markov Model (HMM) based model, or a combination of an HMM based model and Brown et al.'s fourth model, which has been called "Model 6". These latter models are discussed in F. Och and H. Ney, *A Systematic Comparison of Various Statistical Alignment Models*, Computational Linguistics 29(1):19-51 (2003).

These word alignment models are less than ideal, however, in a number of different ways. For instance, although the standard models can theoretically be trained without supervision, in practice various parameters are introduced that should be optimized using annotated data. In the models discussed by Och and Ney, supervised optimization of a number of parameters is suggested, including the probability of jumping to the empty word in the Hidden Markov Model (HMM), as well as smoothing parameters for the distortion probabilities and fertility probabilities of the more complex models. Since the values of these parameters affect the values of the translation, alignment, and fertility probabilities trained by estimation maximization (EM) algorithm, there is no effective way to optimize them other than to run the training procedure with a particular combination of values and to evaluate the accuracy of the resulting alignments. Since evaluating each combination of parameter values in this way can take hours to days on a large training corpus, it is likely that these parameters are rarely, if ever, truly jointly optimized for a particular alignment task.

Another problem associated with these models is the difficulty of adding features to them, because they are standard generative models. Generative models require a generative "story" as to how the observed data is generated by an interrelated set of stochastic processes. For example, the generative story for models 1 and 2 mentioned above and the HMM alignment model is that a target language translation of a given source language sentence is generated by first choosing a length for the target language sentence, then for each target sentence position, choosing a source sentence word, and then choosing the corresponding target language word.

One prior system attempted to add a fertility component to create models 3, 4 and 5 mentioned above. However, this generative story did not fit any longer, because it did not include the number of target language words needed to align to each source language word as a separate decision. Therefore, to model this explicitly, a different generative "story" was required. Thus, a relatively large amount of additional work is required in order to add features.

In addition, the higher accuracy models are mathematically complex, and also difficult to train, because they do not permit a dynamic programming solution. It can thus take many hours of processing time on current standard computers to train the models and produce an alignment of a large parallel corpus.

The present invention addresses one, some, or all of these problems. However, these problems are not to be used to limit the scope of the invention in any way, and the invention can be used to address different problems, other than those mentioned, in machine translation.

The discussion above is merely provided for general background information and is not intended to be used as an aid in determining the scope of the claimed subject matter.

SUMMARY

A weighted linear word alignment model linearly combines weighted features to score a word alignment for a bilingual, aligned pair of text fragments. The features are each weighted by a feature weight. One of the features is a word association metric generated from surface statistics.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter

BRIEF DESCRIPTION OF THE DRAWINGS

FIGS. 5B-1 to 5B-3 are flow diagrams illustrating one embodiment in which potential alignments are incrementally generated and pruned.

DETAILED DESCRIPTION

The present invention deals with bilingual word alignment. However, before describing the present invention in greater detail, one illustrative environment in which the present invention can be used will be discussed.

Figure 1:
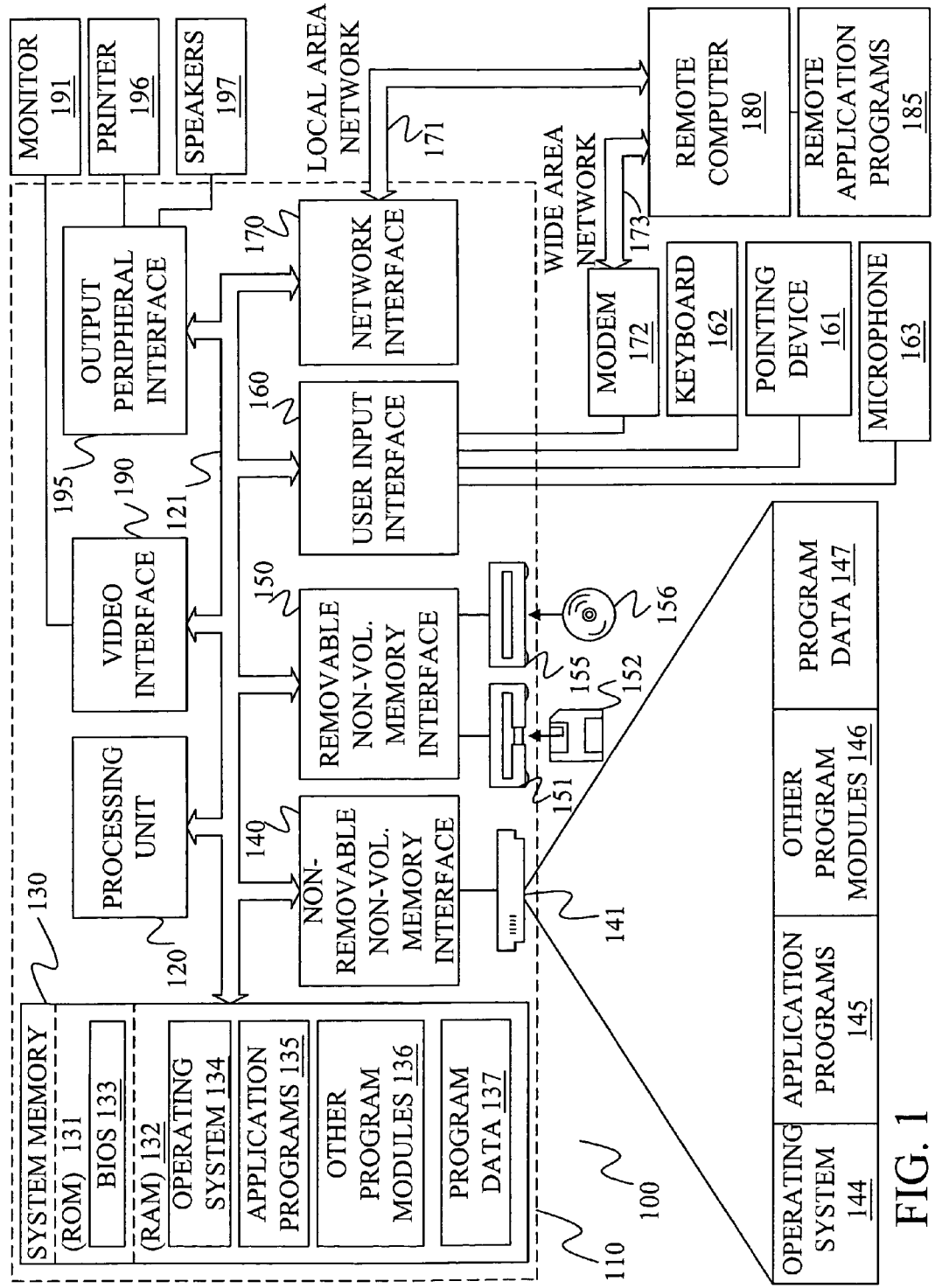
FIG. 1 is a block diagram of one exemplary environment in which the present invention can be practiced.

FIG. 1 illustrates an example of a suitable computing system environment 100 on which embodiments may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing some embodiments includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
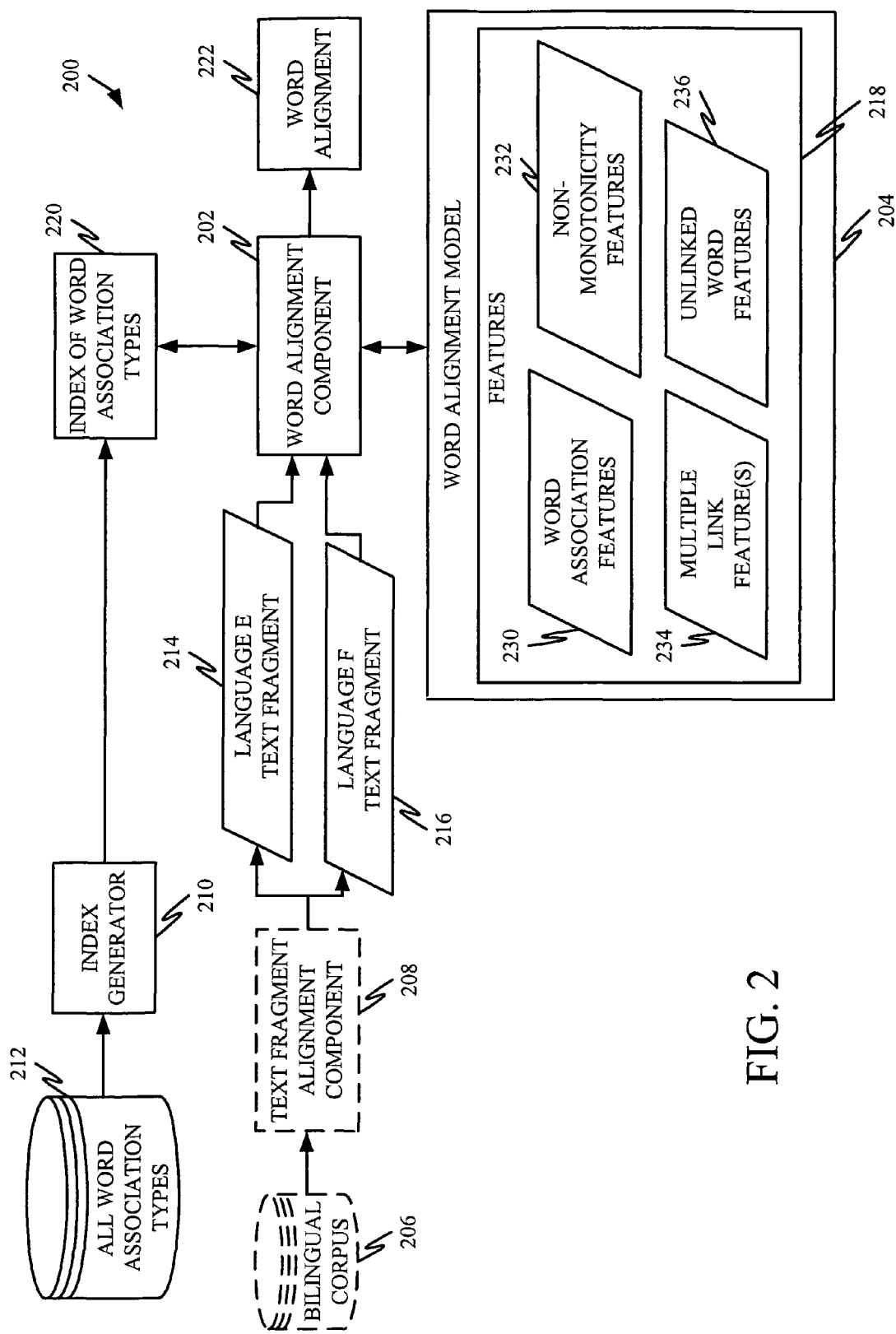
FIG. 2 is a block diagram of one embodiment of a word alignment system.

FIG. 2 is a block diagram of a word alignment system 200 in accordance with one embodiment of the invention. Word alignment system 200 includes word alignment component 202 and word alignment model 204. System 200 is also shown coupled to an optional bilingual corpus 206 and text fragment alignment component 208. Similarly, system 200 is shown with index generator 210 coupled to a store of word association types 212.

Bilingual corpus 206 illustratively includes bilingual data in which text in the first language is found, along with a translation of that text into a second language. For instance, using the English and French languages as an example, bilingual corpus 206 will illustratively include a relatively large amount of English language text along with a French translation of that text. A relatively small amount of bilingual corpus 206 is word-aligned by a person fluent in both languages. Illustratively, bilingual corpus 206 might consist of 500,000 pairs, each pair having an English sentence and its French translation, of which 200 to 300 pairs have been word-aligned by hand.

In order to word-align all the sentences in corpus 206, text fragment alignment component 208 first accesses bilingual corpus 206 to generate pairs of aligned text fragments from bilingual corpus 206. In one illustrative embodiment, the text fragments are sentences, although the text fragments could be other fragments such as clauses, etc.

Text fragment alignment component 208 thus outputs a first text fragment 214 in a first language E (such as English) and a second text fragment 216 in a second language F (such as French) which is the translation of the first text fragment 214. The bilingual, aligned text fragments 214 and 216 (such as bilingual, aligned sentences) are then input to word alignment component 202.

Either text fragment alignment component 208, or a different component, illustratively calculates values of a statistical measure of the strength of word associations in the text-fragment-aligned data. These values are referred to as word association scores and are indicative of a strength of association between a bilingual pair of words, or a bilingual cluster of words. Each pair or cluster of words is referred to as a word association type and is shown in FIG. 2 as being stored, along with its word association score, in a word association type data store 212. These scores can be used to determine feature values in the word alignment model described below. Two different exemplary word association scores that can be used are discussed in detail below, and a number of others are also mentioned. In addition, one or more other features (in addition to those computed from the word association scores) are also defined for possible word alignments. This set of features 218 is used in word alignment model 204.

In one embodiment, index generator 210 accesses all of the various word association types identified in the training data (and stored in word association type data store 212) and indexes those word association types. This is described in greater detail below with respect to FIG. 4. In any case, index generator 210 generates an index 220 of word association types. The index 220 and the word alignment model 204 are available to word alignment component 202 in order to generate a word alignment 222 for a pair of aligned text fragments 214 and 216.

Figure 3:
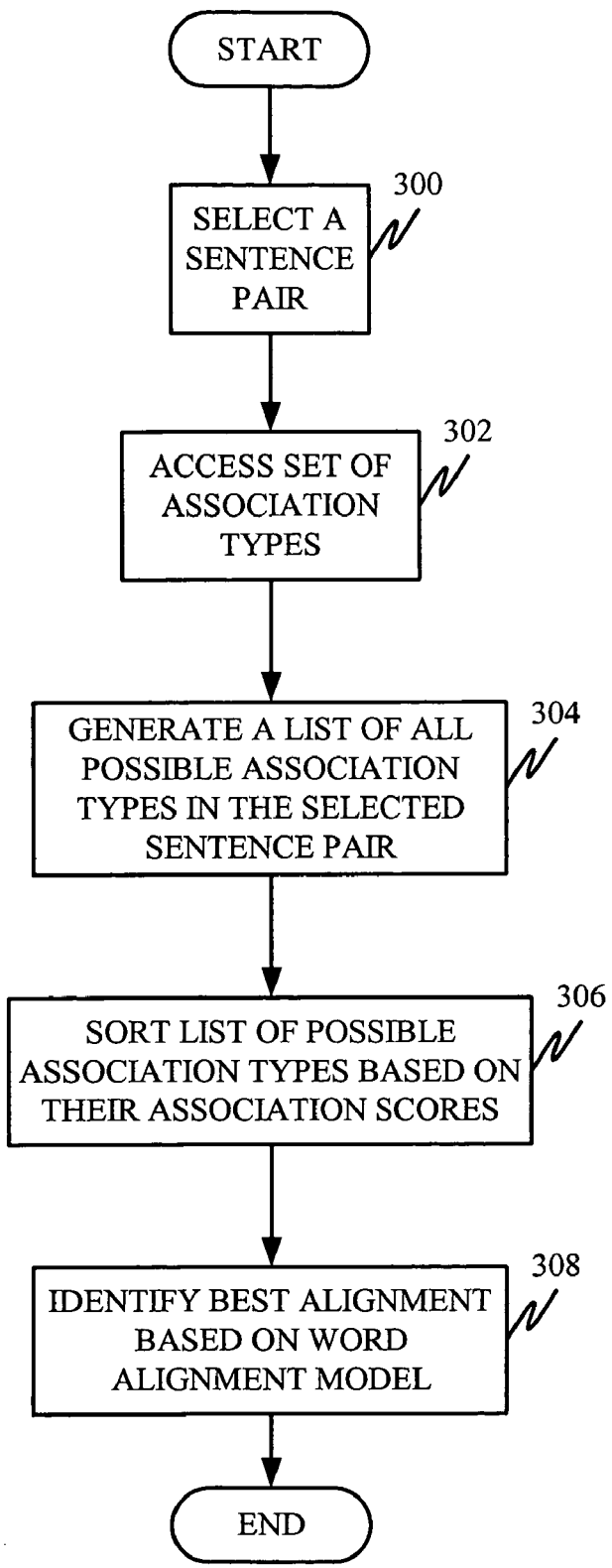
FIG. 3 is a flow diagram illustrating one embodiment of operation of the system shown in FIG. 2.

FIG. 3 is a flow diagram illustrating the operation of system 200 in greater detail. Word alignment component 202 first selects a sentence pair (or text fragment pair). This is indicated by block 300 in FIG. 3. Word alignment component 202 then accesses the set of association types through index 220. This is indicated by block 302. Word alignment component 202 then generates a list of all possible association types that apply to the selected sentence pair. This is indicated by block 304 in FIG. 3.

Word alignment component 202 then sorts the list of possible association types based on their association scores. This is indicated by block 306 in FIG. 3.

Finally, word alignment component 202 identifies the best alignment according to word alignment model 204, by accessing word alignment model 204, and employing the various features 218 in model 204. This is indicated by block 308 in FIG. 3.

In one embodiment, model 204 is generated based on discriminative training of a weighted linear combination of a relatively small number of features. For a given parallel sentence pair, for each possible word alignment considered, model 214 simply multiplies the values of each of the features by a corresponding weight to give a score for that feature, and sums the feature scores to give an overall score for the alignment. The possible alignment having the best overall score is selected as the word alignment for that sentence pair. Thus, for a sentence pair e,f (where e is the sentence in English and f is the sentence in French) model 204 identifies an alignment â such that:

$$\hat{a} = \operatorname{argmax}_a \sum_{i=1}^n \lambda_i f_i(a, e, f) \qquad \text{Eq. 1}$$

where $f_i$ are the features, and $\lambda_i$ are the corresponding features weights.

The weights can be optimized using a modified version of averaged perceptron learning as described below with respect to FIG. 6. This is a relatively quick process. In addition, no generative "story" needs to be invented to explain how the features generate the data, so new features can be easily added to the model without having to change the overall structure of the model.

The specific implementation of word alignment model 204 can be any of a variety of different implementations incorporating a variety of different features. In one embodiment described herein, word alignment model 204 incorporates a feature computed from the different word association scores, mentioned above, intended to indicate how likely various pairs of words or groups of words are to be mutual translations, plus additional features measuring how much word reordering is required by a given alignment, and how many words are left unlinked in that alignment. As discussed below, embodiments of model 204 can also include a feature measuring how often one word is linked to several words in the alignment under analysis.

In the following discussion, and as used above, the term "alignment" is used to mean an overall word alignment of a sentence pair. The term "link" on the other hand is used to mean the alignment of a particular pair of words or small group of words.

In any case, one embodiment of model 204 uses a statistical measure of word association in order to perform bilingual word alignment. The term "word" here and subsequently should be taken very broadly to include any relatively fixed sequence of characters (including a single character) for which a translation relationship can be meaningfully considered. For example, a single punctuation character such as a period or comma may be treated as a word. In the Chinese language, words are conventionally considered to include usually no more than one or two characters. For the purposes of bilingual word alignment, however, it has sometimes proved useful to treat each individual Chinese character as a single word.

On the other hand, many languages, including English, include fixed phrases, such as "in spite of", "according to", or "more than", which function as a single unit and might desirably be treated as single words for purposes of bilingual word alignment or translation. One might also consider breaking what are conventionally regarded as single words into a stem and an inflectional marker (or series of markers) and using each of those as a basic unit for word alignment. For example, the English word "went" might be decomposed into "go" followed by an inflectional marker that might be represented as "+PAST". In what follows, it is simply assumed that the system is dealing with bilingual text segments that have been "tokenized", i.e., broken up, and perhaps transformed, in some way into discrete tokens that we may treat as words for alignment purposes.

While any statistical measure indicative of the strength of association between words can be used, one illustrative statistical measure is referred to as the log likelihood ratio (LLR) statistic. Assume, for instance, that the two languages being discussed are English and French. The log likelihood ratio statistic is a measure of the strength of association between a particular English word and a particular French word. Basically, the log likelihood ratio is computed from bilingual, aligned sentences. The LLR statistic takes into account how often an English word occurs in the English sentences, and how often a French word occurs in the French sentences, and how often they occur together in an aligned sentence pair. One way of calculating LLR scores for words in the training corpus is as follows:

$$LLR(f, e) = \sum_{f? \in \{f, \neg f\}} \sum_{e? \in \{e, \neg e\}} C(f?, e?) \log \frac{p(f? \mid e?)}{p(f?)} \qquad \text{Eq. 2}$$

In Equation 2, f and e refer to the words (in French and in English, respectively) whose degree of association is being measured. When the terms f and e are used, it means that those words occur in the respective target and source sentences of an aligned sentence pair, and ¬f and ¬e mean that the corresponding words do not occur in the respective sentences, whereas f? and e? are variables ranging over these values, and C(f?, e?) is the observed joint count for the values of f? and e?. The probabilities in Equation 2, p(f?|e?) and p(f?), illustratively refer to maximum likelihood estimates.

The LLR scores computed using Equation 2 for a pair of words is high if the words have either a strong positive association or a strong negative association. Therefore, in accordance with one embodiment, any negatively associated word pairs are discarded by requiring that p(f,e)<p(f)·p(e). Also, any word pairs with an LLR score of less than 1 can be discarded as well.

In this particular embodiment of model 204, the word association scores are used to compute word association features 230 used in model 204, and the value of the principal word association feature for an alignment is simply the sum of all the individual log-likelihood ratio scores for the word pairs linked by the alignment. The log-likelihood ratio-based model also includes a plurality of other features.

For instance, one set of features is referred to as non-monotonicity features 232. It may be observed that in closely related languages, word alignments of sentences that are mutual translations tend to be approximately monotonic (i.e., corresponding words tend to be in nearly corresponding sentence positions). Even for distantly related languages, the number of crossing links is far less than chance, since phrases tend to be translated as contiguous chunks. To model these tendencies, non-monotonicity features 232 provide a measure of the monotonicity (or more accurately the non-monotonicity) of the alignment under consideration.

To find the points of non-monotonicity of a word alignment, one of the languages in the alignment is arbitrarily designated as the source, and the other as the target. The word pairs in the alignment are sorted, first by source word position, then by target word position. (That is, the ordering is determined primarily by source word position, and target word position is considered only if the source word positions are the same.) The alignment is traversed, looking only at the target word positions. The points of non-monotonicity in the alignment are places where there are backward jumps in this sequence of target word positions.

For example, suppose a sorted alignment contains the following pairs of linked word positions ((1,1) (2,4) (2,5) (3,2) (5,6)). The first term in this sequence (1,1) means that the first word in the source sentence is aligned with the first word in the target sentence. The second term (2,4) means that the second word in the source sentence is aligned with the fourth word in the target sentence. The third term (2,5) means that the second word in the source sentence is also aligned with the fifth word in the target sentence. The fourth term (3,2) means that the third word in the target sentence is aligned with the second word in the source sentence, and the last term (5,6) means that the fifth word in the source sentence is aligned with the sixth word in the target sentence. The sequence of target word positions in this sorted alignment is (1,4,5,2,6). Therefore, there is one point of non-monotonicity where target word position 2 follows target word position 5.

The particular way in which the degree of non-monotonicity of an alignment is measured can vary. For instance, in one embodiment, the magnitudes of the backward jumps in the target word sequence are summed, and this sum is the measure of non-monotonicity. In another embodiment, the number of backward jumps are counted, and the number of jumps is indicative of the non-monotonicity. Finally, rather than choosing between those various embodiments, both of them can be used. Thus, the non-monotonicity features 232 in word alignment model 204 are illustratively comprised of one or both of these measures of non-monotonicity, or a different set of measures of non-monotonicity.

Another set of features is referred to as a set of multiple link features 234 in word alignment model 204. It has often been observed that word alignment links tend to be 1-to-1. Indeed, word alignment results can often be improved by restricting more general models to permit only 1-to-1 links between words.

In order to model the tendency for links to be 1-to-1, one embodiment of the invention defines a 1-to-many feature as the number of links connecting two words such that exactly one of them participates in at least one other link. The system can also define a many-to-many feature as the number of links that connect two words that both participate in other links. Multiple link features 234 in word alignment model 204 can be either or both of these features. However, in one embodiment, the 1-to-many feature is the only one used in multiple link features 234, while the many-to-many feature is not used directly in the model, but is simply used to reduce the number of alignments that must be considered, as any alignments having a non-zero value of the many-to-many feature are discarded.

A final exemplary feature used in word alignment model 204 is referred to as a set of unlinked word features 236. The unlinked word features 236 simply count the total number of unlinked words in both sentences in an aligned sentence pair. This is used to control the number of words that get linked to something in the aligned sentence pair.

In accordance with another embodiment of word alignment model 204, word association features 230 are not simply the sum of log-likelihood ratio-based word association statistics. Instead, those statistics are replaced with the logarithm of the estimated conditional probability of two words (or combinations of words) being linked, given that they co-occur in a pair of aligned sentences. These estimates are derived from the best alignments according to another, simpler model. For example, if "former" occurs 100 times in English sentences whose French translation contain "ancien", and the simpler alignment model links them in 60 of those sentence pairs, the conditional link probability (CLP) can be estimated for this word pair as 60/100, or 0.6. However, it may be more desirable to adjust the probabilities by subtracting a small fixed discount from the link count as follows:

$$LP_d(f, e) = \frac{links_1(f, e) - d}{cooc(f, e)} \quad \text{Eq. 3}$$

where $LP_d(f,e)$ represents the estimated conditional link probability for the words f and e, $links_1(f,e)$ is the number of times they are linked by the simpler alignment model, d is the discount, and $cooc(f,e)$ is the number of times they co-occur. This adjustment prevents assigning high probabilities to links between pairs of words that rarely co-occur. Illustratively, this discount may have a value between 0 and 1.

One difference between the LLR-based model and the CLP-based model is that the LLR-based model considers each word-to-word link separately, but allows multiple links per word, as long as they lead to alignments consisting only of 1-to-1 and 1-to-many links (in either direction). In the CLP-based model, however, conditional probabilities are allowed for both 1-to-1 and 1-to-many clusters, but all clusters are required to be disjoint.

For instance, the conditional probability of linking "not" (in English) to "ne . . . pas" (in French) can be estimated by considering the number of sentence pairs in which "not" occurs in the English sentence and both "ne" and "pas" occur in the French sentence, compared to the number of times "not" is linked to both "ne" and "pas" in pairs of corresponding sentences. However, when this estimate is made in the CLP-based model, a link between "not" and "ne . . . pas" is not counted if the same instance of "not", "ne" or "pas" is linked to any other words.

The CLP-based model incorporates the same additional features as the LLR-based model, except that it omits the 1-to-many feature since it is assumed that the 1-to-1 versus the 1-to-many tradeoff is already modeled in the conditional link probabilities for particular 1-to-1 and 1-to-many clusters. In other embodiments, the 1-to-many feature may be retained in the CLP-based model, in case it turns out that the conditional link probability estimates are more reliable for 1-to-1 clusters than for 1-to-many clusters, or vice versa.

There are a variety of different bases for estimating the conditional link probabilities. For instance, one estimate of the conditional link probabilities can be derived from the LLR-based model described above, optimized on an annotated development set. Another estimate can be derived from a heuristic alignment model. One such alignment model is "method 4" in Moore, Association-Based Bilingual Word Alignment, Proceedings of the ACL Workshop on Building and Using Parallel Texts, Ann Arbor, Mich., pp 1-8 (2005).

It should also be noted that, in addition to the LLR-based model and the CLP-based model, other weighted linear models using word association scores based on surface statistics can be used as well. By "surface statistics" it is meant any different association metrics that can be defined on a contingency table. In other words, a contingency table for two words is a two-by-two matrix in which the four cells of the matrix indicate a count where neither of the words is present, where one of the words is present but the other is not and vice versa, and where both words are present. There are many different association metrics which can be calculated from such a matrix, including the $\chi^2$ statistic, the Dice co-efficient, or any of wide variety of other metrics.

While the discriminative models discussed above are relatively straightforward to describe, finding the optimal alignment according to these models is non-trivial. Adding a link for a new pair of words can affect the non-monotonicity scores, the 1-to-many score, and the unlinked word score differently, depending on what other links are present in the alignment.

However, a beam search procedure can be used which is highly effective in finding good alignments, when used with these models. This was discussed in brief with respect to FIG. 3 in which an aligned sentence pair is selected, and the set of all possible association types is accessed to generate a list of all possible association types that apply to the selected sentence pair.

Figure 4A:
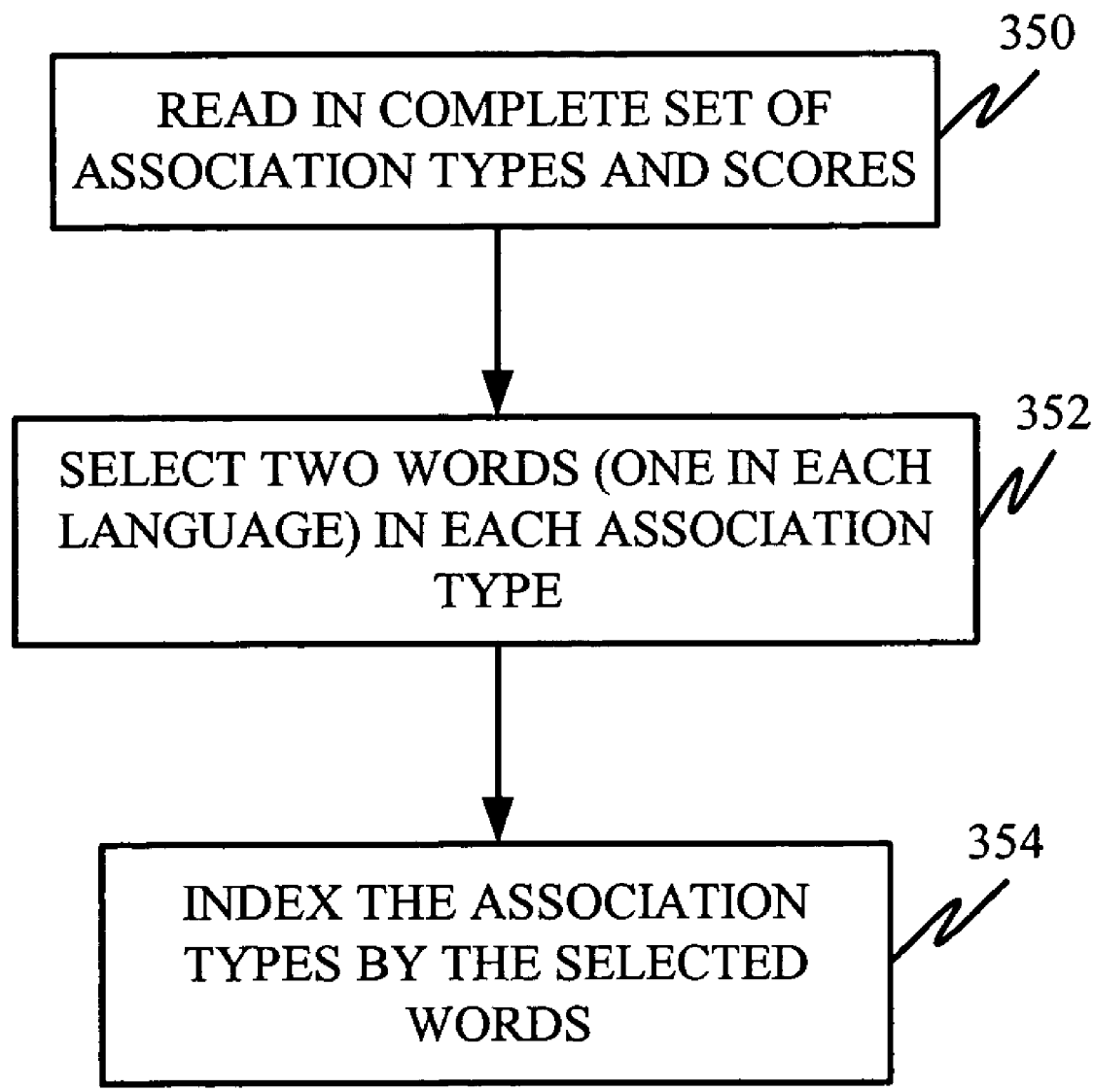
FIG. 4A is a flow diagram illustrating one embodiment for indexing association types.

FIG. 4A is a flow diagram illustrating one embodiment for indexing association types using index generator 210. First, as the complete set of association types and scores are read in from data store 212, index generator 210 selects two words (one in each language) in each association type. Reading in the association types, choosing an association type and selecting the words in the association type is indicated by blocks 350 and 352 in FIG. 4A.

Index generator 210 then indexes the given association type by the selected words. This is indicated by block 354, and results in the index of word association types 220 shown in FIG. 2. This is used by word alignment component 202 as discussed below.

It should be noted that index generator 210 may illustratively generate index 220 prior to runtime. It may illustratively be done at set up time or at any other time as desired.

Figure 4B:
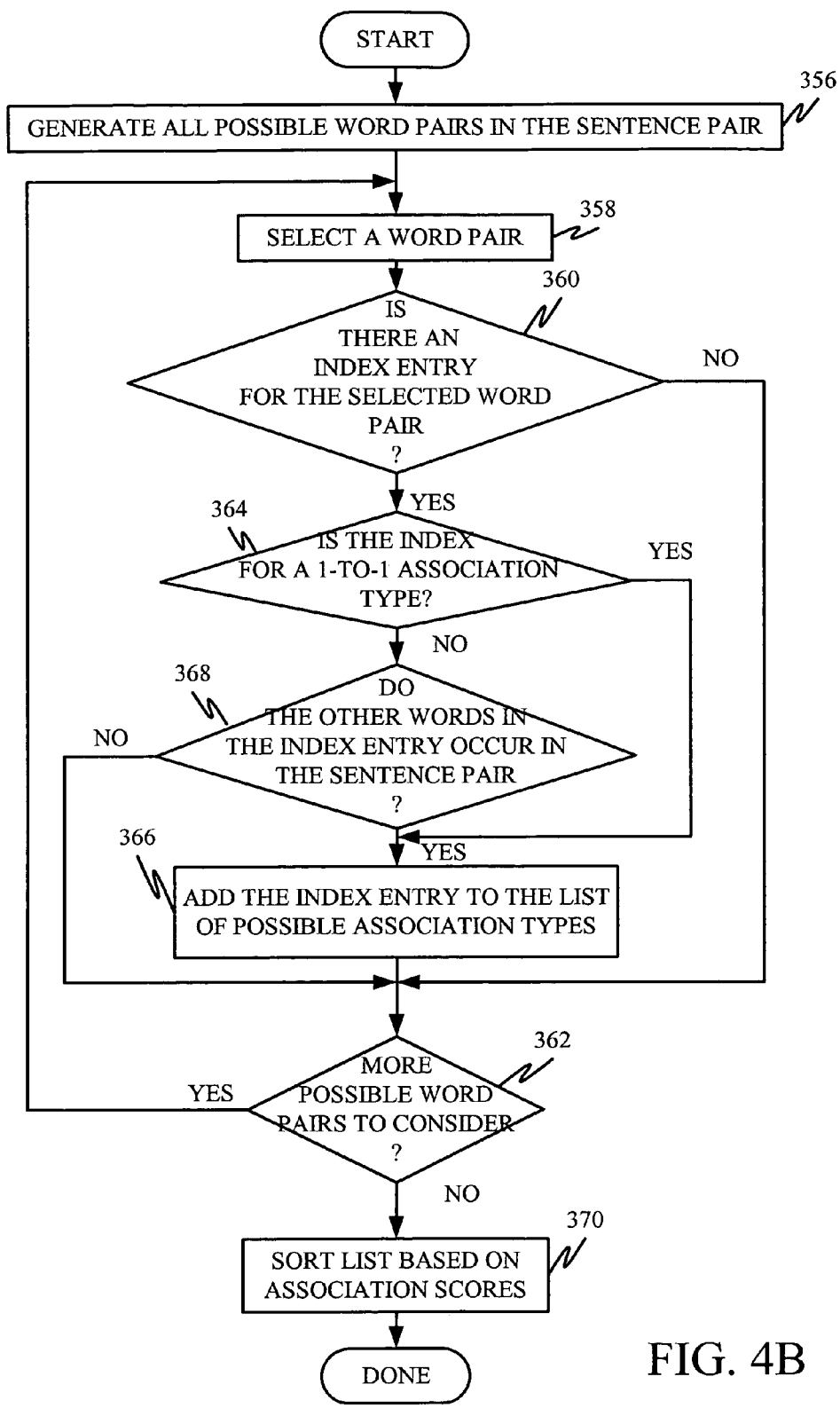
FIG. 4B is a flow diagram illustrating one embodiment for generating a list of possible association types for a sentence pair.

FIG. 4B is a flow diagram better illustrating how the list of all possible association types that apply to the selected sentence pair can be generated. Word alignment component 202 generates all possible word pairs in the pair of aligned sentences 214 and 216. The word pairs represent all combinations of words, one being from the language E text fragment 214 and the other being from the language F text fragment 216. Generating all possible word pairs for the aligned sentences (or text fragments) is indicated by block 356 in FIG. 4B.

Word alignment component 202 then selects one of the word pairs from the list. This is indicated by block 358. Word alignment component 202 then determines whether there is an index entry for the selected word pair. In doing so, word alignment component 202 accesses index 220 to determine whether it contains an entry for the selected word pair from the list of word pairs generated from the aligned text fragments 214 and 216. Checking for the index entry is indicated by block 360 in FIG. 4B.

If there is no index entry, then word alignment component 202 determines whether there are any more possible word pairs in the list to be considered. If so, processing reverts to block 358 where another word pair is selected. Determination of whether there are more word pairs to be considered is indicated by block 362 in FIG. 4B.

If, at block 360, word alignment component 202 determines that there is an index entry in index 220 for the selected word pair, then word alignment component 202 determines whether the index entry is for a 1-to-1 association type. In other words, component 202 determines whether the index entry is only a link between a single word in text fragment 214 and a single word in text fragment 216, where neither of the words have additional links specified by the association type. This is indicated by block 364. If the index entry is for a 1-to-1 association type, then the association type represented by the index entry is simply added to the list of possible association types generated for the aligned text fragments 214 and 216. This is indicated by block 366 in FIG. 4B.

If, at block 364, it is determined that the index entry is not a for a 1-to-1 association type, then word alignment component 202 determines whether the other words in the association type represented by the index entry (other than those which are listed in the index entry) occur in the pair of aligned text fragments 214 and 216. This is indicated by block 368 in FIG. 4B. In other words, if the index entry represents a 1-to-many association type, then component 202 determines whether all of the words in the association type occur in the pair of aligned text fragments. If the words do occur in the pair of aligned text fragments 214 and 216, then the association type represented by the index entry is also added to the list of possible association types for the aligned text fragments 214 and 216.

It will be noted that, in accordance with one embodiment, many-to-many association types are not considered. In that case, those association types can be omitted from index 220, in which case the many-to-many association type will never be selected. Other ways of omitting many-to-many association types can be used as well, and it may in some cases be desirable to use such association types, in which case they are left in and treated as a 1-to-many association type at this point.

Once all of the word pairs have been considered as determined at block 362, then the list of possible association types for the aligned text fragments 214 and 216 is sorted based on association scores, from strongest association score to weakest association score. This is indicated by block 370 in FIG. 4B.

In another embodiment of the present invention, instead of first generating all possible word pairs in the sentence pair as in block 356, and then determining which ones index a possible association type for the sentence pair, the possible association types can be determined incrementally as the possible word pairs are generated. That is, as each word pair is generated, the operations indicated in blocks 360, 364, 368, and 366 are performed for that word pair, before the next possible word pair is generated.

Figure 5A:
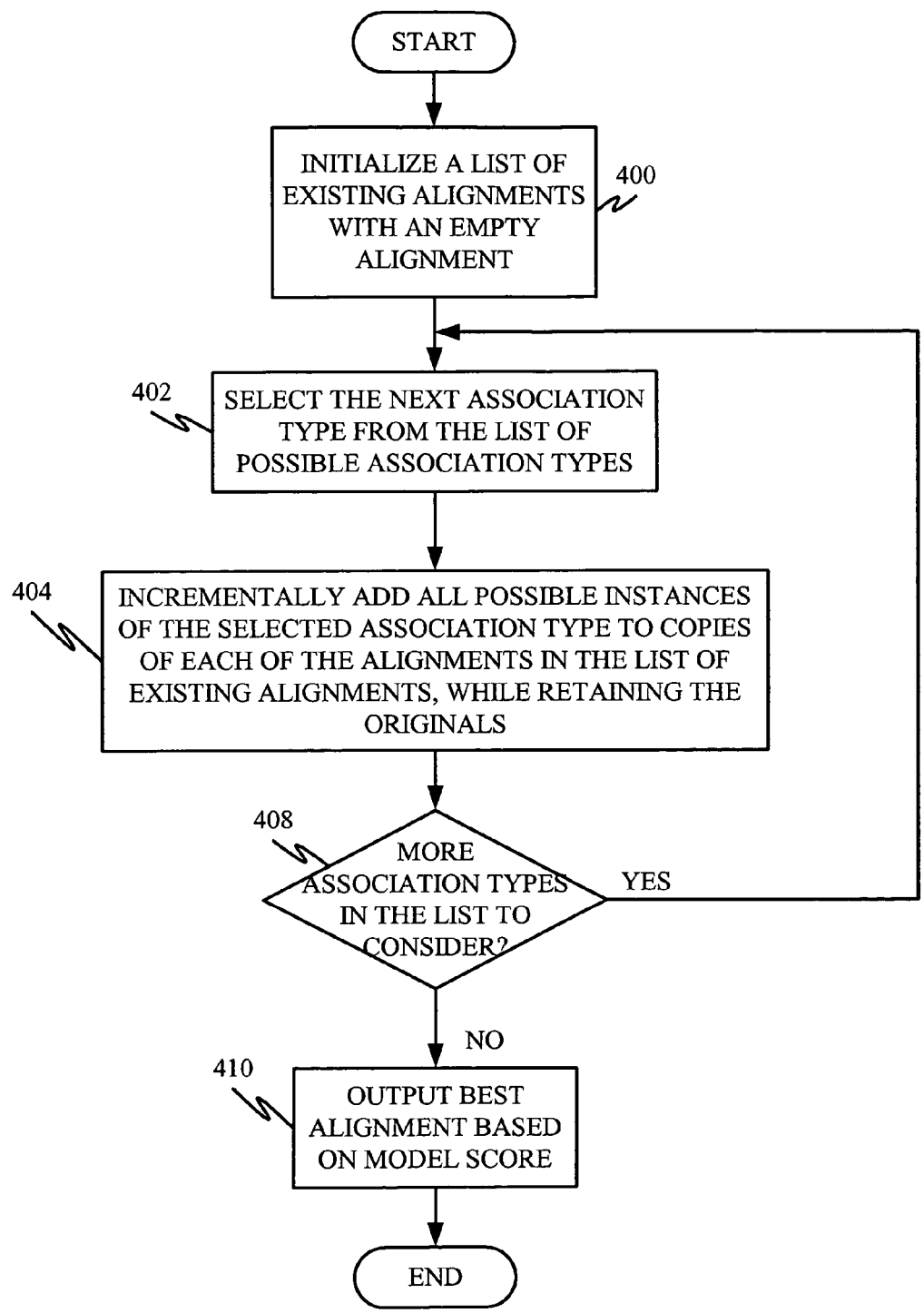
FIG. 5A is a flow diagram illustrating how a best alignment is identified in more detail.

Once this list of possible association types for the pair of aligned sentences 214 and 216 under consideration has been generated, word alignment component 202 then identifies the best alignment according to word alignment model 204 using the list of possible association types. FIG. 5A is a flow diagram illustrating the process of identifying the best alignment (also represented by blocks 306 and 308 in FIG. 3) in more detail.

Word alignment component 202 first initializes a list of existing alignments to contain only an empty alignment along with its overall score. Since an empty alignment has no links, the overall score for an empty alignment will simply be the total number of words in both sentences, multiplied by the unlinked word feature weight. This is indicated by block 400 in FIG. 5A. Component 202 then selects the highest scoring association type not yet considered from the list of possible association types just generated as described with respect to FIG. 4. Selecting one of the possible association types is indicated by block 402 in FIG. 5A.

Component 202 then incrementally adds all possible instances of the selected association type to copies of each of the alignments in a list of current alignments, keeping the previous alignments as well (before each instance of the association type is added). This is indicated by block 404 in FIG. 5A.

If there is more than one instance, in the aligned text fragments 214 and 216, of the selected association type being processed, then component 202 picks one instance and tries adding that instance to each of the alignments, and repeats that process for each of the instances. As each instance is considered, the alignments created by adding earlier instances are included in the existing potential alignments that component 202 adds the new instance to.

Without pruning, the number of possible alignments generated by component 202 would combinatorially increase dramatically. Therefore, the set of alignments is pruned by component 202, as new alignments are generated as indicated by block 404 in FIG. 5A. One embodiment in which the alignments are pruned as they are generated will be described in greater detail below with respect to FIGS. 5B-1 to 5B-3.

Component 202 iterates through the sorted list of association types, from best to worst, creating new alignments that add links for all instances of the association type currently being considered to existing alignments, potentially keeping both the old and new alignments in the set of possible alignments being generated. This continues until there are no more association types in the list to consider. This is indicated by block 408 in FIG. 5A. The particular way in which the new links are added is also described in greater detail below with respect to FIGS. 5C and 5D.

Once the final set of potential alignments has been generated, component 202 simply outputs the best scoring word alignment 222 (shown in FIG. 2) based upon the score generated by word alignment model 204 (also shown in FIG. 2). This is indicated by block 410 in FIG. 5A.

Figures 1, 5B:
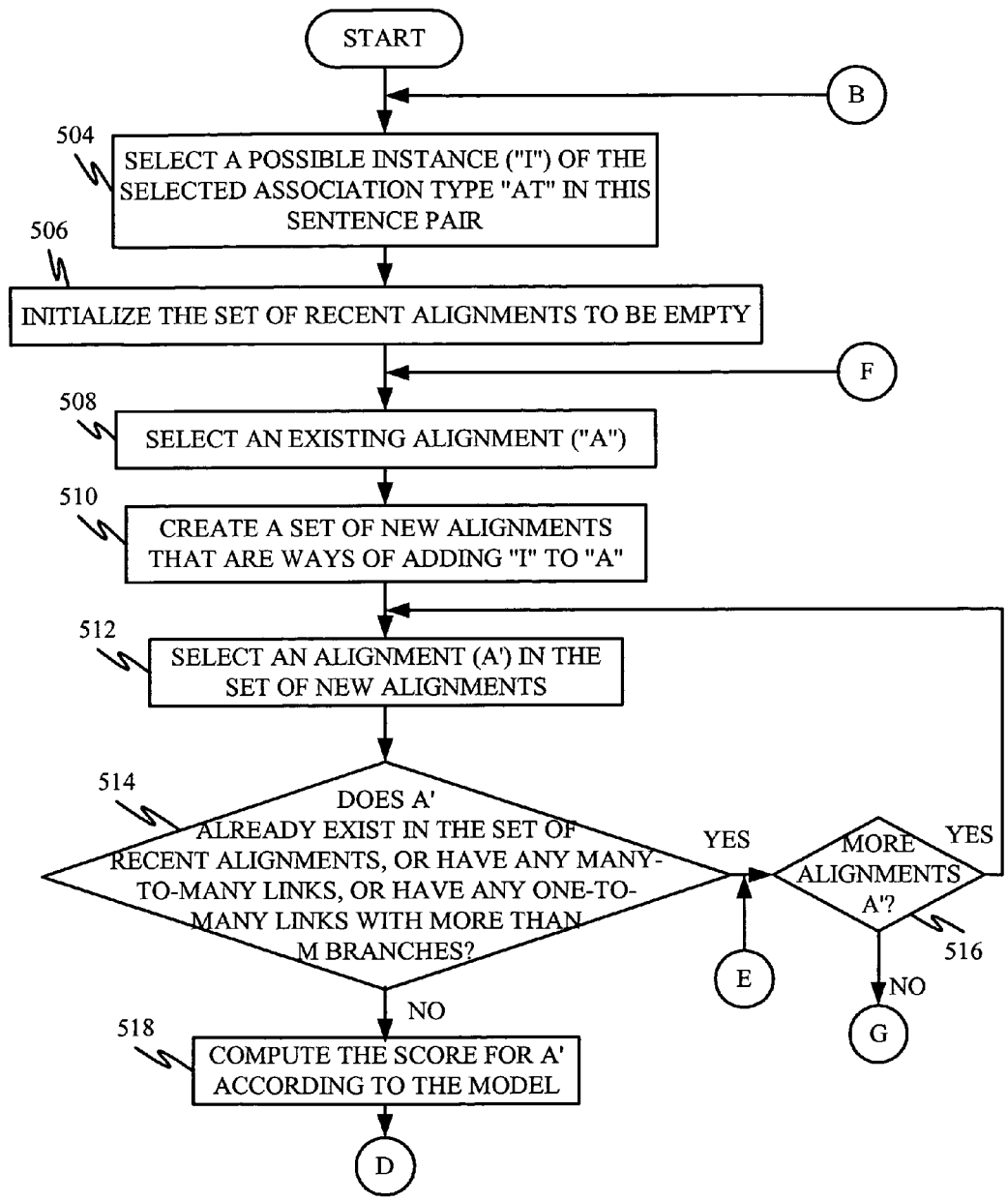
Figures 2, 5B:
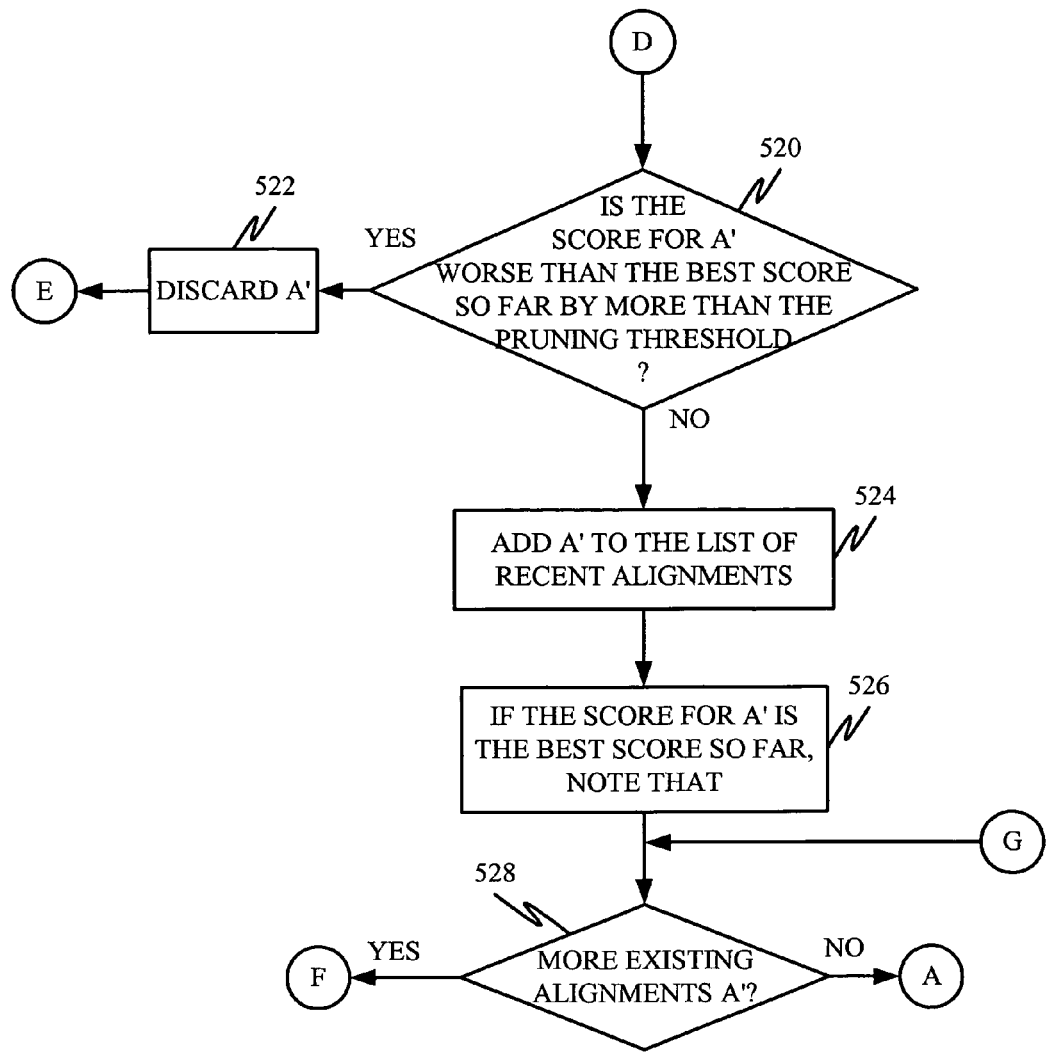
Figures 3, 5B:
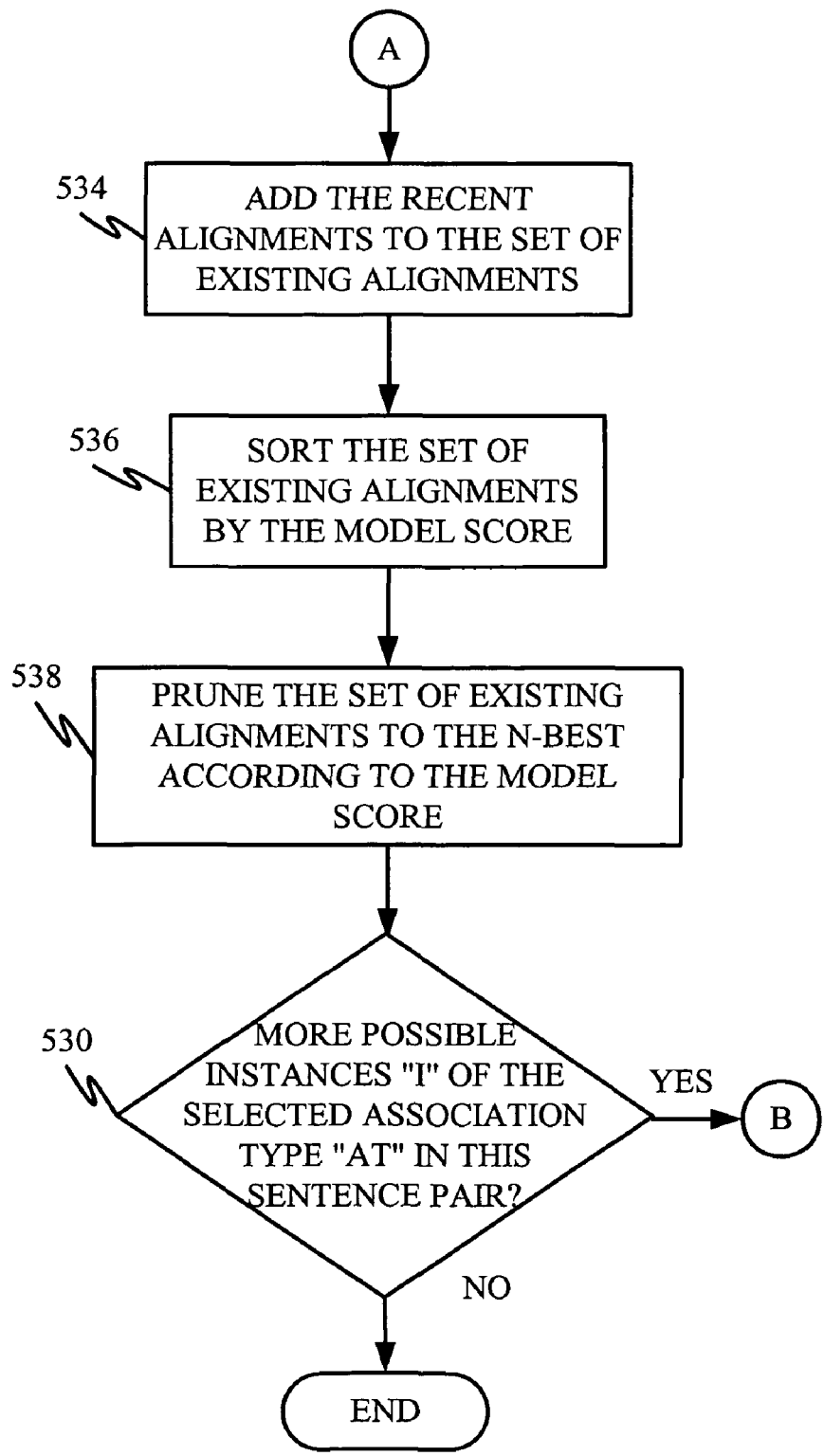

FIGS. 5B-1 to 5B-3 (collectively FIG. 5B) are flow diagrams better illustrating how the list of potential alignments might be incrementally generated and pruned during the processing described with respect to block 404 of FIG. 5A.

First, a possible link "I" that is an instance of the selected association type is selected in the sentence pair. This is indicated by block 504 in FIG. 5B.

The set of recent alignments is initialized to be empty. This is indicated by block 506 in FIG. 5B. An existing alignment "A" is selected, and a set of new alignments is created. The new alignments are ways of adding "I" to "A". Selecting the existing alignment and creating a set of new alignments is indicated by blocks 508 and 510 in FIG. 5B.

Once the set of new alignments is created, an alignment (A') is selected from the set of new alignments. This is indicated by block 512 in FIG. 5B.

Component 202 then determines whether A' already exists in the set of recent alignments, or whether it has any many-to-many links in it, or whether it has any one-to-many links with more than a predetermined value "M" branches. This is indicated by block 514 in FIG. 5B. The value of "M" can be set empirically, or in any other desired way, and it is believed that a value of approximately 3 works well.

If, at block 514, word alignment component 202 determines that the selected alignment A' either already exists in the set of recent alignments or has many-to-many links in it, or has any one-to-many links with more than M branches, then processing moves to block 516 where component 202 determines whether there are any more alignments A' to consider. However, if, at block 514, component 202 determines that A' does not already exist in the set of recent alignments, and it does not have any many-to-many links in it, and it does not have any one-to-many links with more than "M" branches, then word alignment component 202 computes the score for the alignment A' according to the model 204. Computing the score is indicated by block 518 in FIG. 5B.

Word alignment component 202 then determines whether the score for the alignment A' is worse than the best score computed so far by more than a pruning threshold amount. This is indicated by block 520 in FIG. 5B. If so, then the alignment A' is discarded, and processing again moves to block 516 where component 202 determines whether there are any more alignments A' to be processed. Discarding the alignment is indicated by block 522 in FIG. 5B. The pruning threshold can be any desired value and can be set empirically or otherwise.

If, at block 520, word alignment component 202 determines that the score for the alignment A' is not worse than the best score so far by more than the pruning threshold, then component 202 adds the alignment A' to the list of recent alignments. This is indicated by block 524 in FIG. 5B. If the score for the alignment A' is the best score so far, then component 202 notes that as well. This is indicated by block 526.

Component 202 then determines whether there are more existing alignments "A" to be processed. If so, processing reverts back to block 508. If not, however, component 202 adds the recent alignments to the set of existing alignments. This is indicated by block 534 in FIG. 5B. The set of existing alignments is then sorted based on the model score and is pruned back to the N-best existing alignments based on the model score. Sorting the set of existing alignments is indicated by block 536 and pruning to the N-best existing alignments is indicated by block 538 in FIG. 5B. While the value of N can be any desired or empirically determined value, it is believed that a value in a range of approximately 10-20 works well.

Component 202 then determines whether there are more possible links "I" that are instances of the selected association type in the sentence pair currently being processed. If so, processing reverts back to block 504. Determining whether there are more existing alignments "A" is indicated by block 528, and determining whether there are more possible links "I" is determined by block 530.

If, at block 530, component 202 determines that there are no more instances of the association type to be processed, then component 202 has completed the processing indicated by block 404.

Figures 5C, 5D:
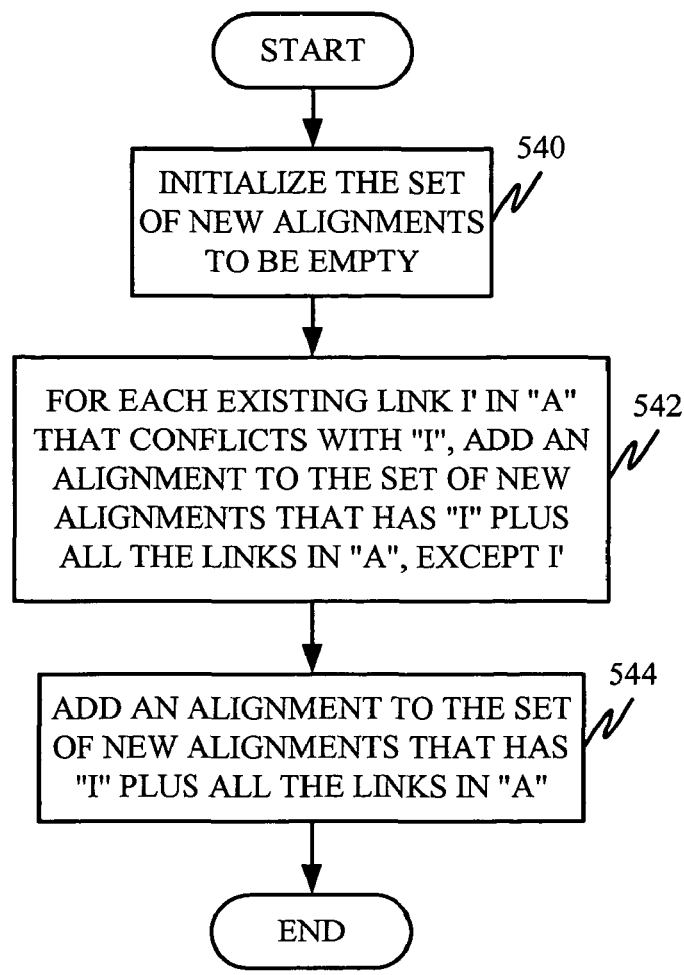
FIG. 5C is a flow diagram illustrating one embodiment for adding a new link to an existing alignment in a first model.
FIG. 5D is a flow diagram illustrating an embodiment of adding a new link to an existing alignment in a second model.

FIG. 5C illustrates one embodiment for creating a set of new alignments that add a link to an existing alignment (represented by block 510 in FIG. 5B) in more detail. FIG. 5C illustrates the process for the embodiment in which word alignment model 204 uses the log-likelihood ratio metric in computing the word association features 230.

Component 202 first initializes the set of new alignments to be empty. This is indicated by block 540 in FIG. 5C. Next, for each existing link I', in alignment "A" that conflicts with the instance "I", component 202 adds an alignment to the set of new alignments that has link for the instance "I" plus all the links in the alignment "A", except the existing link I'. This is indicated by block 542 in FIG. 5C. Component 202 then adds an alignment to the set of new alignments that has "I" plus all the links in "A". This is indicated by block 544 in FIG. 5C.

An extra pruning technique can also be used with the LLR-based model. In generating the list of possible association types to be used in aligning a given sentence pair, we use only association types which have the best association score for this sentence pair for one of the word types involved in the association. The idea is to discard associations not likely to be used. For example, in data from the Canadian Parliament, "Prime Minister" and "premier ministre" frequently occur in parallel sentence pairs. In one illustrative training corpus, the association scores for each pair of one of these English words and one of these French words are as follows:

4125.02019332218 Minister ministre
2315.88778082931 Prime premier
1556.9205658087 Prime ministre
1436.06392959541 Minister premier All four pairs have quite high association scores, but in aligning a sentence pair that contains both "Prime Minister" and "premier ministre", we would not consider the associations between "Prime" and "ministre" and between "Minister" and "premier", because in those two pairings, neither word is the most strongly associated with the other for this sentence pair. This pruning step can be applied as the list of possible association types for a selected sentence pair in being generated in block 304, just before block 366.

FIG. 5D is a flow diagram illustrating how new links are added to existing alignments in the embodiment in which model 204 uses the conditional link probabilities in computing the word association features 230.

Component 202 simply lets the set of new alignments contain only an alignment having a link for the instance "I" plus all links in the alignment "A" that are not conflicting with the instance "I". This is indicated by block 546 in FIG. 5D.

Figure 6:
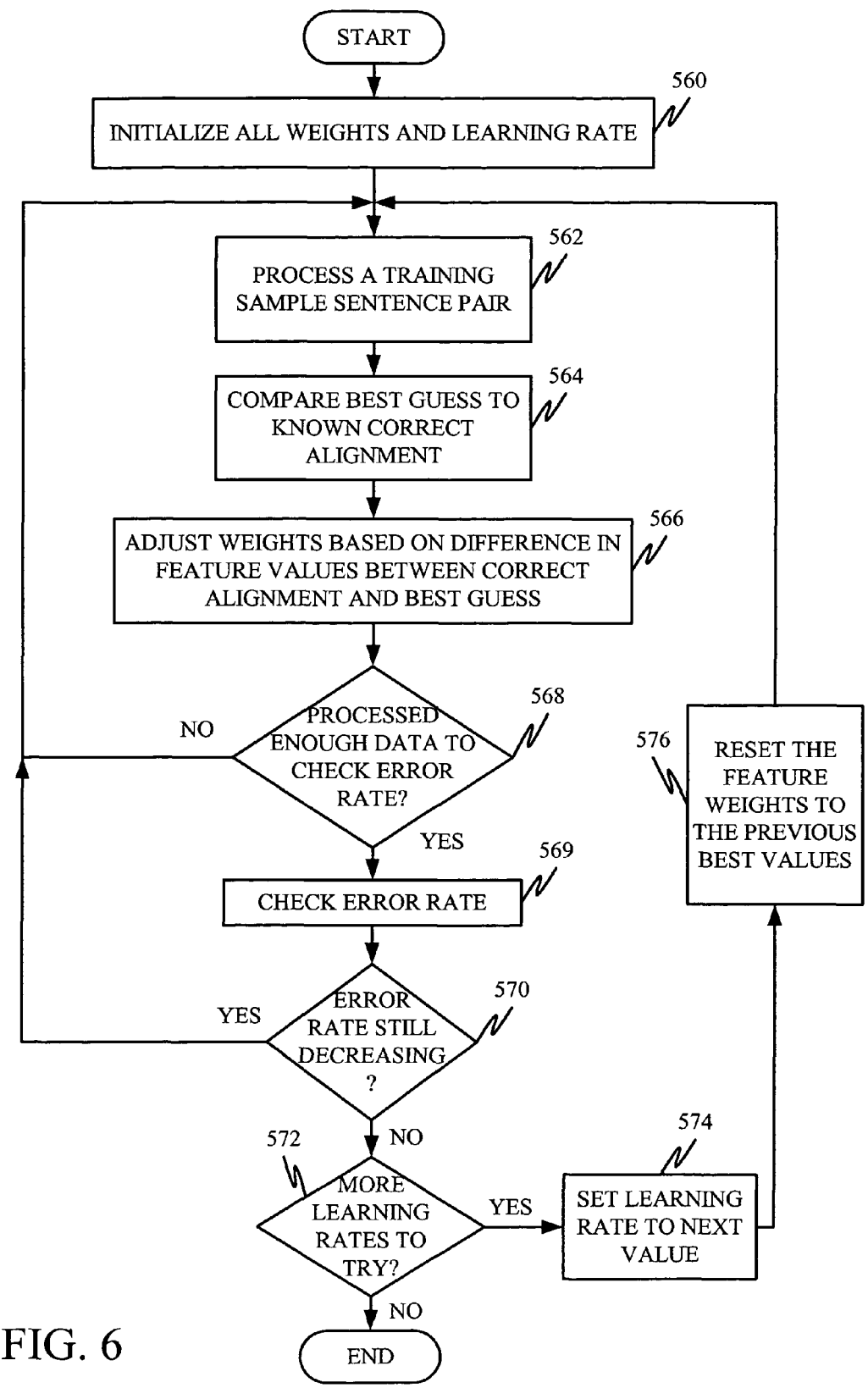
FIG. 6 is a flow diagram illustrating one embodiment for optimizing parameters for the model.

FIG. 6 is a flow diagram illustrating one embodiment for optimizing the feature weights ($\lambda_i$) for the features used by model 204. Prior to discussing FIG. 6, a brief discussion of perceptron learning is provided. In one embodiment, the optimization technique is a modified version of averaged perceptron learning. Perceptron learning and averaged perceptron learning techniques are known. Briefly, starting with an initial set of feature weight values, perceptron learning iterates through the annotated training data multiple times, comparing, for each sentence pair, the best alignment ($a_{hyp}$) according to the current model with the reference alignment ($a_{ref}$). At each sentence pair, the weight for each feature is incremented by the difference between the value of the feature for the reference alignment, and the value of the feature for the best alignment according to the model as follows:

$$\lambda_i \leftarrow \lambda_i + (f_i(a_{ref}, e, f) - f_i(a_{hyp}, e, f)) \qquad \text{Eq. 4}$$

The updated feature weights are used to compute $a_{hyp}$ for the next sentence pair.

Iterating through the data continues until the weights stop changing, because $a_{ref} = a_{hyp}$ for each sentence pair, or until some other stopping condition is met.

In the averaged perceptron learning technique, the feature weights for the final model are the average of the weight values over all the data, rather than simply the values after the final sentence pair of the final iteration.

In accordance with one embodiment of the optimization technique, the present system averages the weight values over each pass through the data, rather than over all passes. It is believed that this leads to faster convergence. After each pass of perceptron learning through the data, another pass is made through the data with feature weights fixed to their average value for the previous learning pass, in order to evaluate current performance of the model. The system iterates over this procedure until a local optimum is found.

Also, in accordance with one embodiment of the present system, a fixed weight is provided for the word association feature 230. It is believed that this feature is of significant importance in the model, and fixing the weight can be fixed to any desired or empirically determined value. In one embodiment, the weight is fixed to 1.0. Allowing all weights to vary allows many equivalent sets of weights that differ only by a constant scale factor. Fixing one weight thus eliminates a spurious apparent degree of freedom.

By eliminating this degree of freedom, and fixing one of the weights, the present system thus employs a version of perceptron learning that uses a learning rate parameter. As is known, the perceptron update rules involve incrementing each weight by the difference in the feature values being compared. If the feature values are discrete, however, the minimum difference may be too large compared to the unweighted association score. Therefore, the present system multiplies the feature value difference by a learning rate parameter $\eta$ to allow smaller increments when needed as follows:

$$\lambda_i \leftarrow \lambda_i + \eta(f_i(a_{ref}, e, f) - f_i(a_{hyp}, e, f)) \qquad \text{Eq. 5}$$

For the CLP-based model, based on the typical feature values expected, the learning rate can be set to any empirically determined value. In one embodiment, the learning rate is set to 0.01, although different rates can be used and optimizations on the rate can be performed as desired.

For the LLR-based model, the LLR scores can become very large (such as 100,000 for a 500,000 pair corpus) but small differences can be significant. Thus, small differences in the weighting values are also likely to be significant. This means that a learning rate small enough to allow convergence on a desired weight value may require a very large number of iterations through the data in order to reach those values. Thus, in accordance with one embodiment, the present system uses a progression of learning rates, starting at a relatively large value (which can be empirically determined, and one example of which is approximately 1000) and reducing each successive weight until a final desired learning weight is reached. Of course, the level of reduction can be empirically determined or set as desired. In one embodiment, the learning rate is reduced, successively by an order of magnitude until a learning rate of 1 is reached. Of course, other values can be used as well. At each transition between learning rates, the feature weights are reinitialized to the optimum values found with the previous learning rate. This can be done based on error rate or any other desired measure.

With this in mind, FIG. 6 is a flow diagram illustrating one embodiment in which the parameter weights ($\lambda_i$) are trained or optimized. First, all of the weights, and the learning rate, are initialized. This is indicated by block 560 in FIG. 6. In one embodiment, the weight for the word association feature 230 is initialized to 1.0 and the weights for the other features are initialized to 0.0.

A training sample sentence pair, annotated with its correct word alignment, is then processed as described above with respect to the previous figures, in order to obtain a best guess at a word alignment for the sentence pair. This is indicated by block 562.

The best guess is then compared to the known correct alignment for the sentence pair. This is indicated by block 564.

The weights ($\lambda_i$) are then adjusted based on the difference in feature values between the correct alignment and the best guess. This is indicated by block 566 in FIG. 6, and is shown in Eq. 5 above.

It is then determined whether enough data has been processed in order to check the error rate. This is indicated by block 568. In other words, it may be desirable not to check the error rate after processing each training sentence pair. Instead, it may be desirable to process a plurality of different training sentence pairs before checking the error rate. Therefore, determining whether enough data has been processed to check the error rate is indicated by block 568. Illustratively, it may be desirable to process all the annotated training sentence pairs once between occurrences of checking the error rate.

If so, then the error rate is checked to determine whether it is still decreasing since the last time it was checked. This check is performed using the average values for the feature weights since the last time the error rate was checked, applied to a specified set of annotated sentence pairs. This set may be the entire set of training sentence pairs used in adjusting the feature weights, a subset of that set, or an independent set of annotated sentence pairs. This is indicated by block 569 in FIG. 6. If the error rate is still decreasing, as indicated by block 570, then processing reverts back to block 562 where training continues by processing additional training samples. In other words, it is determined that the learning rate is still set at a level such that, as learning continues, the model is getting better and the error rate associated with the model is decreasing. Therefore, processing continues using the current learning rate.

However, if, at block 570, the error rate has started to increase (or is at least no longer decreasing) then it is determined that training has flattened out with respect to the current learning rate. It is thus determined whether there are any additional learning rates to try during the training process. This is indicated by block 572. If not, training is complete and the weights that yielded the lowest error rate are used.

However, if, at block 572 it is determined that there are more learning rates to try, then the learning rate is set to its next lowest value, and the feature weights are reset to the values that have yielded the lowest error rate so far. This is indicated by block 574 and 576. Processing then continues at block 562 in which training samples are again processed in order to continue training the model feature weights $\lambda_i$.

Practitioners skilled in the art will recognize that many other variations of perceptron learning may be used to optimize the model feature weights, and that other learning methods such as maximum entropy modeling or maximum margin methods, including support vector machines, may be used to optimize the feature weights. If the number of feature weights is small, direct optimization methods such as Powell's method or the downhill simplex method may also be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A word alignment system, comprising:
    a weighted linear word alignment model, linearly combining feature values for a plurality of different features of a given word alignment to assign a score to each of a plurality of word alignments for a pair of text fragments, each of the different feature values being weighted by a corresponding trained feature weight indicative of the relative importance of a given feature to the plurality of features, wherein one of the plurality of different features in the word alignment model is a word association metric indicative of a strength of association between words in the pair of text fragments, the word association metric being based on one of surface statistics from a training corpus, and a conditional link probability word association metric, the one of surface statistics from the training corpus including an association metric that is defined in a contingency table, the contingency table including a matrix of cells for each of the plurality of word alignments, each of the cells associated with a count and one of the plurality of word alignments, a first one of the cells corresponding to no words in the associated one of the plurality of word alignments being present, a second one of the cells corresponding to two words in the associated one of the plurality of word alignments being present, a third one of the cells corresponding to a first word in the associated one of the plurality of word alignments being present but not a second word in the associated one of the plurality of words alignments, and a fourth one of the cells corresponding to the second word in the associated one of the plurality of word alignments being present but not the first word in the associated one of the plurality of word alignments, and wherein one of the different features is something other than a word association metric indicative of a strength of association between words in the pair of text fragments that is summed with the word association metric;
    an automatic training component training the feature weights for the individual feature values used by the weighted linear word alignment model, wherein the automatic training component uses annotated training data separate from the pair of text fragments to train the feature weights;
    a word alignment component receiving the pair of text fragments and accessing the word alignment model to identify the best scoring word alignment for the pair of text fragments; and
    a computer processor being a functional component of the word alignment system and facilitating training of the feature weights.

2. The word alignment system of claim 1 wherein the word association metric comprises a log-likelihood word association metric.

3. The word alignment system of claim 1 wherein the plurality of different features comprise:
    a non-monotonicity feature indicative of a non-monotonicity of the given word alignment.

4. The word alignment system of claim 1 wherein the plurality of different features comprise:
    an unlinked words feature indicative of a number of unlinked words in the given word alignment.

5. The word alignment system of claim 1 wherein the plurality of different features comprise:
    a multiple links feature indicative of a number of words in the given alignment that are linked to multiple other words in the given alignment.

6. The word alignment system of claim 1 and further comprising:
    an index of word association types coupled to the word alignment component.

7. The word alignment system of claim 1 wherein the automatic training component is a discriminative automatic training component.

8. The word alignment system of claim 7 wherein the discriminative automatic training component is based on a form of perceptron learning.

9. The word alignment system of claim 8 wherein the discriminative automatic training component is based on a form of averaged perceptron learning.

* * * * *